United States Patent [19]
Murry et al.

[11] Patent Number: 5,887,445
[45] Date of Patent: Mar. 30, 1999

[54] TWO SPOOL ENVIRONMENTAL CONTROL SYSTEM

[75] Inventors: Roger P. Murry, San Pedro; Kathrine J. Clarke, Hermosa Beach; Dan S. Matulich, Rolling Hills Estates, all of Calif.

[73] Assignee: AlliedSignal Inc., Morristown, N.J.

[21] Appl. No.: 967,437

[22] Filed: Nov. 11, 1997

[51] Int. Cl.⁶ .................................................. F25D 9/00
[52] U.S. Cl. ................................................. 62/402; 62/87
[58] Field of Search ................................ 62/87, 88, 401, 62/402, 172

[56] References Cited

U.S. PATENT DOCUMENTS

| | | |
|---|---|---|
| 2,697,917 | 12/1954 | Mayer .......................................... 62/87 |
| 3,153,916 | 10/1964 | Schuhmacher .............................. 62/87 |
| 4,198,830 | 4/1980 | Campbell . |
| 4,312,191 | 1/1982 | Biagini ....................................... 62/402 |
| 5,086,622 | 2/1992 | Warner . |
| 5,704,218 | 1/1998 | Christians et al. ......................... 62/172 |

FOREIGN PATENT DOCUMENTS 687482  5/1964  Canada ....................................... 62/87

*Primary Examiner*—William Doerrler
*Attorney, Agent, or Firm*—Robert Desmond, Esq.

[57] ABSTRACT

A two spool environmental control system includes a low pressure spool subsystem having a low pressure turbine. A high pressure spool subsystem is in air flow communication with the low pressure spool subsystem, while the high pressure spool subsystem is capable of conditioning compressed air prior to the low pressure spool subsystem conditioning the compressed air. The high pressure spool subsystem includes a high pressure turbine which is mechanically operable independently of the low pressure turbine.

23 Claims, 2 Drawing Sheets

TWO SPOOL ENVIRONMENTAL CONTROL SYSTEM

BACKGROUND OF THE INVENTION

The present invention generally relates to air cycle Environmental Control Systems (ECSs). More specifically, the invention relates to an improved two spool ECS and improved method of conditioning water vapor compressed air by utilizing two spool subsystems in series with one another while increasing efficiency and flexibility.

ECSs are used to provide a supply of conditioned air to an enclosure, such as an aircraft cabin and cockpit. In the past, an air cycle ECS has typically operated on a flow of bleed air taken from an intermediate or high pressure stage within a jet engine having multi-compression stages. The bleed air has usually been pre-cooled within a primary heat exchanger with heat being dumped to RAM air and then flowed to a compressor. After compression, the air has been routed through a series of heat exchangers and condensers. Then, the air has typically been expanded by a turbine which is mechanically engaged to the compressor. Finally, the air can be sent to the cabin.

Past air cycle ECS designs have included 2, 3 and 4 wheel bootstrap, high pressure water separation cycles. The general distinction among the three designs relates to the number of so-called wheels which are mechanically engaged to one another. All three of the bootstrap designs typically utilize a reheater and a condenser heat exchanger to respectively pre-cool the bleed air and then condense the water vapor in it. After condensation, the condensed water is removed by a water extractor. The resulting dehumidified air flows to the reheater where the remaining water droplets are evaporated, leaving the residual moisture in the vapor phase. The dry air then flows to a turbine for expansion and consequent cooling. The expansion will typically cool the air to below freezing temperature and thus the vapor particles form ice nuclei and crystallize into snow, which are swept downstream. The expanded air from the turbine can then be used to cool and condense water in the condenser heat exchanger.

For the 2 and 3 wheel system, the expanded air which has been warmed in the condenser can then be directly supplied to a cabin. However, the differentiating feature between those two systems is that the 2 wheel typically has the turbine engaged to a compressor, while the 3 wheel has the turbine engaged to the compressor as well as a fan which pulls RAM air through the system. In the 4 wheel design, shown for example in U.S. Pat. No. 5,086,622, the expanded air which has been warmed in the condenser is then further expanded by another turbine for eventual supply to the cabin. That design has the two turbines engaged to the compressor and fan, i.e., 4 wheels. Also, the design in U.S. Pat. No. 5,086,622 does not flow the dehumidified air through a reheater prior to entering the first turbine. That presents a disadvantage since the residual condensed water droplets in the first turbine inlet stream impinge on the cold turbine blades and outlet walls and freeze out if the metal temperatures are much below freezing. Ice then quickly accumulates and must be rapidly melted to avoid clogging the cycle.

A common disadvantage to the 3 and 4 wheel bootstrap systems is that it creates an "off-design" limitation. In particular, the fan is forced to operate at the same speed as the compressor and turbine(s), even though the fan typically finds optimal performance at a speed lower than the compressor and turbine(s). Thus, a compromise is made in design optimization, which has usually been balanced in favor of the compressor and turbine(s). The 2 wheel system shown in U.S. Pat. No. 4,198,830 partially ameliorates the "off-design" limitation by incorporating a 2 spool design. In other words, the fan is engaged to a turbine by one spool and another turbine is engaged to the compressor by another spool. The spools operate independently of one another by having bleed air separately routed to each spool. Accordingly, the spools can be said to be operating in "parallel" to one another. Thereby, the fan can operate at a speed independent of that of the compressor and its related turbine, which has often been about one-fourth the speed of the compressor/turbine.

Yet, having spools parallel to one another in the 2 wheel bootstrap system creates energy inefficiencies. With the parallel design, the fan and its related turbine operate off the bleed air before it is compressed and conditioned. In contrast, the compressor and its related turbine(s) operate off the bleed air upon being compressed and conditioned. Thus, during auxiliary power unit operation, while a majority of the bleed air (perhaps about 87%) is subject to being conditioned, it is not all of the bleed air. The consequence is that, among other things, the cooling capacity is reduced. Also, if only a small portion of the bleed air (perhaps about 13%) is going to turn the fan, there is less fan power as compared to a situation where all of the bleed air is used. Less fan power translates into requiring larger RAM air heat exchangers. Another energy inefficiency in the prior 2 wheel system is that the heat of condensation and sensible cooling is lost to the supply air. That is due to the fact that the supply air typically comes directly from the condenser, with no downstream means of recovery. Furthermore, the past 2 wheel system has typically provided no means for utilizing the spool containing the fan as an alternative conditioning spool in the event of a failure by the other spool.

As can be seen, there is a need for an improved two spool ECS and method of conditioning high pressure water vapor bearing air which effectively increases cooling capacity by decreasing the required size of heat exchangers. There is an additional need for such a system and method which increases efficiency by recovering the heat of condensation and sensible cooling that might otherwise be lost to the supply air, for example. A further need is a two spool ECS and method which provides flexibility in use, including the ability to still provide conditioned air when one of the two spools is non-operational.

SUMMARY OF THE INVENTION

A two spool environmental control system comprises a low pressure spool subsystem comprising a low pressure turbine; and a high pressure spool subsystem in air flow communication with the low pressure spool subsystem, while the high pressure spool subsystem is capable of conditioning compressed air prior to the low pressure spool subsystem conditioning the compressed air, and the high pressure spool subsystem comprising a high pressure turbine which is mechanically operable independently of the low pressure turbine.

A method of conditioning water vapor bearing bleed air comprises the steps of providing a high pressure spool subsystem comprising a high pressure turbine and a compressor; and placing a low pressure spool subsystem downstream of and in air flow communication with the high pressure spool subsystem, while the air flow communication is in the absence of rotating engagement between the subsystems, and the low pressure subsystem comprises a low pressure turbine and a fan.

These and other features, aspects and advantages of the present invention will become better understood with reference to the following drawings, description and claims.

DETAILED DESCRIPTION OF THE INVENTION

Figure 1:
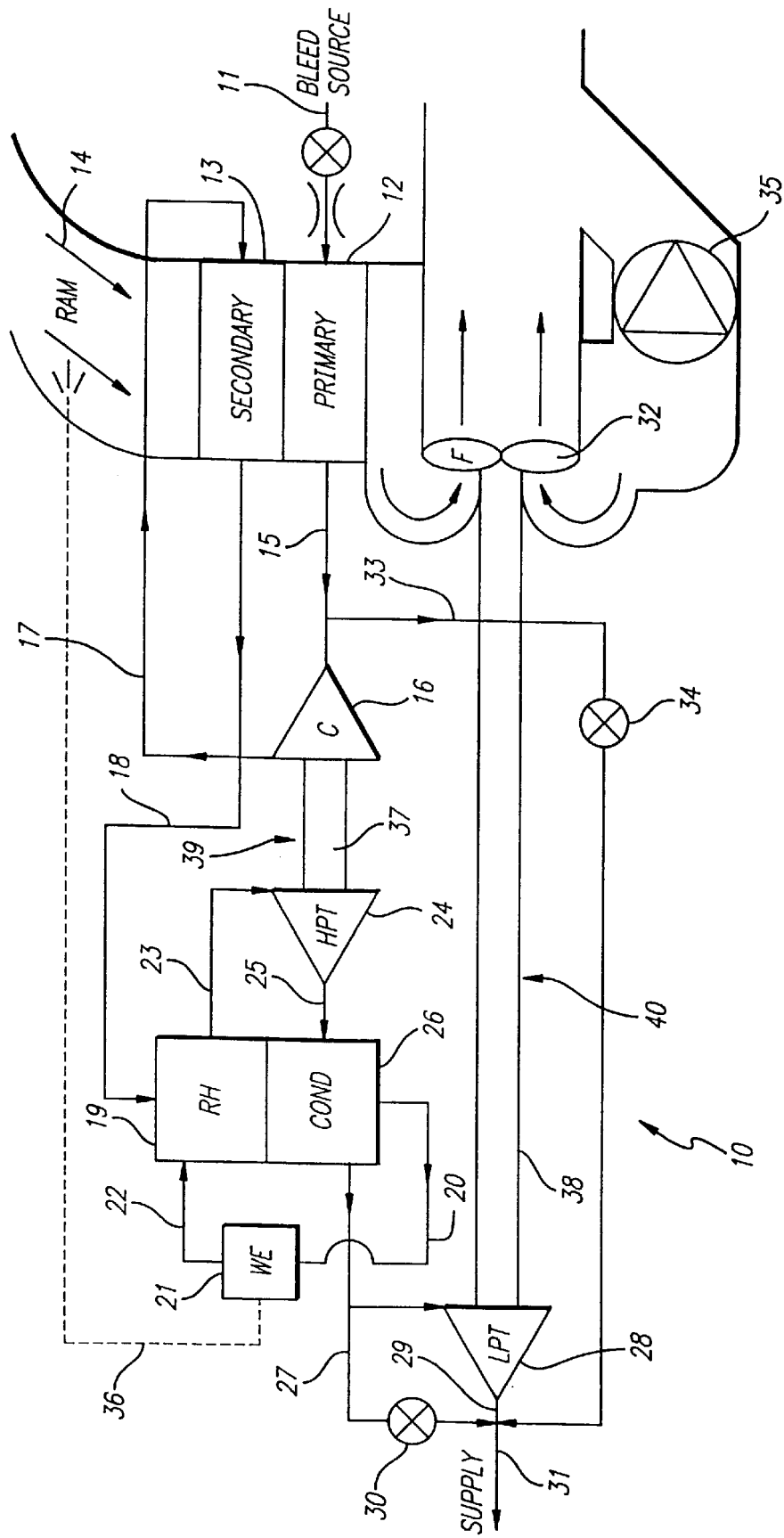
FIG. 1 is a schematic diagram of an environmental control system according to an embodiment of the present invention.

FIG. 1 schematically depicts an environmental control system (ECS) 10 according to one preferred embodiment of the present invention. The ECS 10 comprises a high pressure spool subsystem 39 which is in air flow communication with a low pressure spool subsystem 40. However, the subsystems 39, 40 are not mechanically engaged to one another, such as by a single spool or rotating shaft used in prior 3 and 4 wheel systems. The high pressure spool subsystem 39 is primarily directed to conditioning water vapor bearing air for supply to, for example, an enclosure. The conditioning includes condensing water vapor and cooling the air. The low pressure spool subsystem 40 is also involved in conditioning the air, but its primary function is to drive a fan, for example, which might be for moving ambient air which serves as a coolant medium in the overall system. More specifically, the high pressure spool subsystem 39 comprises a compressor 16, a secondary heat exchanger 13, a reheater 19, a condenser 26, a water extractor 21, and a high pressure turbine 24. The low pressure spool subsystem 40 includes a low pressure turbine 28 and a fan 32. With the subsystems 39, 40 being in a series arrangement, as opposed to parallel one, the entirety of the water vapor bearing air to be conditioned can flow first through the high pressure spool subsystem 39 and then through the low pressure subsystem 40. Nevertheless, the present invention contemplates that a preferred embodiment can optionally allow a flow in parallel. Such a parallel flow means that the water vapor bearing air can flow through the low pressure spool subsystem 40 without first flowing through the high pressure spool subsystem 39.

If the selected environment for the present invention is an aircraft, the water vapor bearing air may be a bleed air 11 from a turbine engine of the aircraft. The bleed air 11 flows through the high pressure spool subsystem 39 while water vapor is condensed in the condenser 26 and then the condensed water vapor is extracted by the water extractor 21. The air flow is then reheated in the reheater 19 and next expanded by the high pressure turbine 24. The flow from the turbine 24 passes back through the condenser 26 and then exits as a supply air 31 or moves into the low pressure spool subsystem 40. In the subsystem 40, the air is expanded by the low pressure turbine 28 and exits as the supply air 31.

In more particularly describing the present invention, and as shown in FIG. 1, the bleed air 11 is sent to the primary heat exchanger 12 such that the bleed air 11 is in heat exchange relationship with a RAM or ambient air 14. After the bleed air 11 is cooled in a primary heat exchanger 12, a resulting pre-cooled air passes through a duct 15 and into the compressor 16 where the air is compressed to a high pressure. Although the amount of compression may vary depending upon the pressure of bleed air 11 from the turbine engine of the aircraft (which may often be about 43 psia), it is contemplated that the compression ratio will typically be around 1.4 to 1.6 in the context of an aircraft. A compressed air exits the compressor 16 through a duct 17 and enters the secondary heat exchanger 13 whereby further cooling of the compressed air occurs. A compressed or high pressure, water vapor bearing air exits the secondary heat exchanger 13 and flows through a duct 18.

The reheater 19 receives the water vapor bearing air from the duct 18 and places such air in heat exchange relationship with a dehumidified air, which is more fully described below. The dehumidified air serves as the coolant medium means in the heat exchange process and so absorbs a heat of condensation and heat of sensible cooling. By such heat exchange process, the water vapor bearing air is cooled and the dehumidified air is heated. Although cooled, water condensation does not occur to a substantial extent. For this embodiment, it is contemplated that not more than about 30% of the total water content in the water vapor is condensed in the reheater 19. Therefore, what is produced is a cooled water vapor bearing air which passes into the condenser 26.

The condenser 26 places the cooled water vapor bearing air in heat exchange relationship with an expanded air, which is more fully described below. The heat exchange process causes to be condensed a substantial amount of the total water vapor that exists. Preferably, the total amount of condensation is more than about 80% of the total water content for this embodiment. Additionally, the heat exchange process in the condenser 26 enables the expanded air to recover a heat of condensation and a heat of sensible cooling which can be converted into useful energy by the low pressure spool subsystem 40, as further described below. Upon the heat exchange process occurring, a water condensed air exits the condenser 26 through a duct 20 and passes into the water extractor 21.

The water extractor 21, in this embodiment, preferably extracts about 90% of the condensed water from the water condensed air to provide a dehumidified air. Optionally, the extracted water can be flowed through a duct 36 for additional cooling of the RAM air 14 before the air 14 is drawn through the heat exchangers 12, 13. Whether the extracted water is used for further cooling of the RAM air 14, the dehumidified air flows through a duct 22 and into the reheater 19. Therein, and as mentioned above, the dehumidified air is placed in heat exchange relationship with the water vapor bearing air. Because of the heat exchange relationship, the reheater 19 not only heats the dehumidified air, but it also allows any remaining condensed water to evaporate and sensible heat to be absorbed. And such absorption occurs in a fashion whereby the absorbed heat can eventually be recovered in the cycle as shaft power, rather than being completely dumped into the supply air 31, for example. As can be appreciated by those skilled in the art, the amount of recovery of the heat of sensible cooling within the reheater 19 is at least partial, with the specific amount of recovery being dependent upon the size of the reheater 19 and the drop in sensible temperature across the high pressure turbine 24. Preferably, and for this embodiment, the amount of recovery is about 50 to 80% of the total amount of heat available for recovery. Irrespective of the amount of recovery, the reheater 19 produces from the dehumidified air a reheated air.

The reheated air exits the reheater 19 through a duct 23 and can then flow into the high pressure turbine 24, which may be operating at about 50 psia for an aircraft. The turbine 24 not only expands the reheated air but it also recovers as shaft power some of the heat of sensible cooling in the reheated air, with the amount being dependent upon its expansion pressure ratio. In this embodiment of the invention wherein an expansion pressure ratio is preferably about 2.1 to 2.4, the amount of recovery is about 70 to 80% of the total heat available for recovery. The recovered heat can be used by the turbine 24, for example, to increase its rotating speed, boost its pressure ratio, and increase the expansion of the reheated air. Further, and as seen in FIG. 1, the turbine 24 is mechanically engaged to the compressor 16 by means of a high pressure shaft 37 which, in the context of an aircraft, can be typically operating at a speed twice that of a low pressure shaft 38 described below. Thus, heat or energy absorbed by the turbine 24 can be converted to useful energy by the compressor 16. When the high pressure turbine 24 expands the reheated air an intermediate pressure expanded air is produced which flows out the turbine 24 through a duct 25.

Next, the intermediate pressure expanded air flows through the condenser 26 whereby that expanded air is warmed as a result of the heat exchange relationship between the expanded air and the cooled water vapor bearing air coming from the reheater 19. Also due to the heat exchange process, the expanded air absorbs a heat of condensation and heat of sensible cooling that is rejected by the water vapor bearing air. While the size of the condenser 26 can change the amount of heat absorbed, it is contemplated that about 70% of the total available heat is absorbed in the condenser 26. A warmed, intermediate pressure expanded air is produced to exit the condenser 26 via a duct 27. In the duct 27, the warmed, intermediate pressure expanded air can optionally flow through a valve 30 to control the temperature of the supply air 31. Alternatively, the warmed, intermediate pressure expanded air can flow directly into the low pressure spool subsystem 40 and, specifically, the low pressure turbine 28 which may be typically operating at about 22 psia when the turbine 24 is at about the 50 psia noted above. The direct flow from the condenser 26 to the turbine 28 is different from past 2 wheel designs whereby the low pressure turbine did not receive a flow from a condenser. In the low pressure turbine 28, the air is further cooled by it being expanded by the turbine 28 and exiting as a low pressure expanded air. Similar to the high pressure turbine 24, the turbine 28 can recover the heat of condensation and sensible cooling from the warmed, high pressure expanded air. As with the high pressure turbine 24, the low pressure turbine 28 recovers heat in an amount dependent upon its expansion pressure ratio. In this embodiment of the invention wherein an expansion pressure ratio for the turbine 28 is preferably about 1.5 to 1.8, the amount of recovery is about 10 to 20% of the total heat available for recovery. Again, the recovered heat can be used to increase the turbine 28 rotating speed. And since the low pressure turbine 28 is mechanically engaged to a fan 32 by means of a low pressure shaft 38, the energy can be used to turn the fan 32 and draw more RAM air 14 through the heat exchangers 12, 13. A check valve 35, however, is provided to allow the RAM air 14 to bypass the fan 32 during flight operation of an aircraft.

It can be seen that the low pressure shaft 38 and its associated wheels (i.e., turbine 28 and fan 32) mechanically operate independently of the high pressure shaft 37 and its associated wheels (i.e., turbine 24 and compressor 16). Through such independent operation and the serial air flow arrangement of the subsystems 39, 40, the size of the heat exchangers 12, 13 can be smaller by about 10 to 15% when compared to past designs for the same cooling capacity. Also, the ECS 10 operating parameters can be more optimally adjusted for increased performance by the use of valve system described below.

In still referring to FIG. 1, it can be appreciated that the temperature of the supply air 31 is not only controlled through the valve 30 but also the valve 34. As with the valve 30 which allows an operator to raise the temperature of the supply air 31 if the air temperature from the turbine 28 is too low, the valve 34 does likewise. However, it can be seen that the valve 34 will allow more heat to be added to the supply 31 since the valve 34 enables a flow of air through a duct 33 which branches from the outlet of the primary heat exchanger 12. Of course, the outlet of the primary heat exchanger 12 will carry more water vapor and a higher temperature in comparison to that air which has been conditioned and passes through the valve 30. Consequently, the air through valve 34 can be preferably used for greater changes to the supply 31 when compared to the valve 30.

Figure 2:
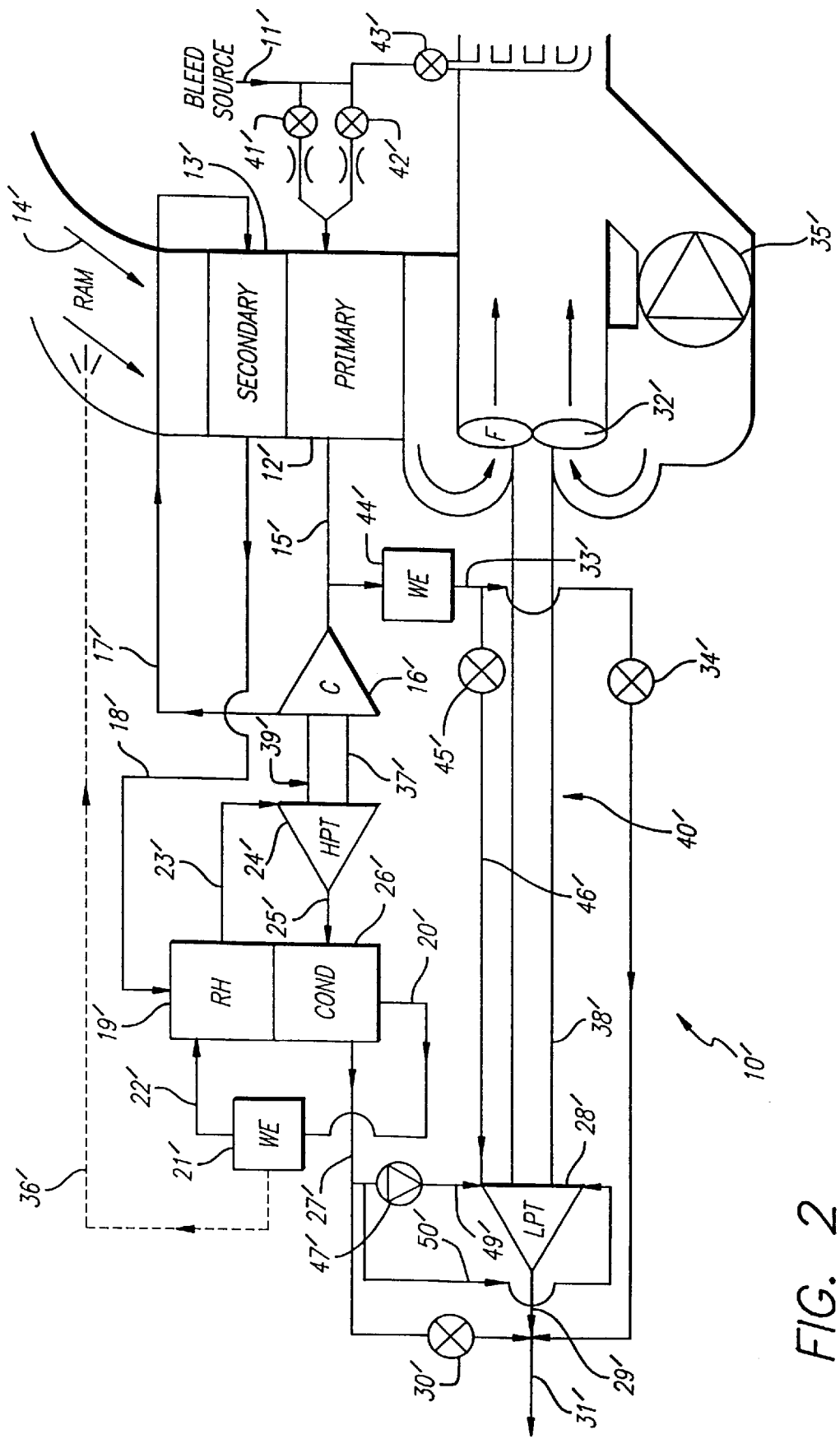
FIG. 2 is a schematic diagram of an environmental control system according to another embodiment of the present invention.

FIG. 2 schematically shows another embodiment of the present invention. Although the embodiments shown in FIGS. 1 and 2 operate in generally the same manner, the embodiment in FIG. 2 allows more variability and optimization of an environmental control system (ECS)10'. By way of example, the embodiment shown in FIG. 2 allows greater control of the temperature and humidity of a supply air 31'. It also allows a low pressure spool subsystem 40' to provide conditioning of the air independently of conditioning by a high pressure spool subsystem 39'. Thus, if one of the two subsystems 39', 40' fails, the other can be used to still provide the supply air 31'. As in the other embodiment, the high pressure spool subsystem 39' comprises a compressor 16', a secondary heat exchanger 13', a reheater 19', a condenser 26', a water extractor 21', and a high pressure turbine 24'. The low pressure spool subsystem 40' includes a low pressure turbine 28' and a fan 32'. However, unlike the embodiment shown in FIG. 1, this embodiment allows the subsystems 39', 40' to work in series or in parallel.

As shown in FIG. 2, a bleed air 11' is controlled by valves 41', 42' for receipt by the primary heat exchanger 12' wherein the bleed air 11' is placed in heat exchange relationship with a RAM or ambient air 14'. A resulting pre-cooled air passes through a duct 15' and into the compressor 16'. Alternatively, the pre-cooled air can bypass the compressor 16' and flow into a water extractor 44' if, for example, the compressor 16' is malfunctioning. In that instance, the water extractor 44' can extract an amount of water vapor (preferably about 90% of the total condensed water) that may have condensed in the primary heat exchanger 12'. After extraction, a partially dehumidified air exits the water extractor 44' and can optionally flow, via a valve 45', into the low pressure spool subsystem 40' or, via a valve 34', into the supply air 31'. If the partially dehumidified air flows into the low pressure spool subsystem 40', the air can be further conditioned. On the other hand, if the partially dehumidified air bypasses the low pressure spool subsystem 40' no further conditioning of the air occurs before it goes into the supply air 31'.

If the flow from the primary heat exchanger 12' does not bypass the compressor 16', the air can be compressed in an amount similar to the first embodiment and exit the compressor 16' through a duct 17'. From the duct 17', the flow enters the secondary heat exchanger 13' and exits therefrom as a compressed or high pressure, water vapor bearing air. The water vapor bearing air exits the secondary heat exchanger 13' through a duct 18' such that the reheater 19' receives it. As with embodiment show in FIG. 1, the water vapor bearing air is placed in heat exchange relationship with a dehumidified air such that the dehumidified air absorbs a heat of condensation and heat of sensible cooling. The amount of absorbed heat is similar to the first embodiment. Again, however, water condensation does not occur to a substantial extent (i.e., not more than about 30% for this embodiment). Therefore, a cooled water vapor bearing air passes into the condenser 26' where another heat exchange process occurs, as in the first embodiment of this invention, such that the water vapor is condensed. Also, as in the first embodiment, an expanded air recovers a heat of condensation and a heat of sensible cooling which is of an amount similar to the first embodiment of the invention. The recovered heat can be converted into useful energy by the low pressure spool subsystem 40'.

A water condensed air exits the condenser 26' through a duct 20' and passes into the water extractor 21' with a dehumidified air exiting therefrom. Just as in the first embodiment, the extracted water can be flowed through a duct 36' for additional cooling of the RAM air 14'. From the water extractor 21', the dehumidified air flows through a duct 22' and into the reheater 19'. Therein, the dehumidified air absorbs a heat of sensible cooling similar in amount to the first embodiment of the invention. A reheated air exits the reheater 19' through a duct 23' and enters the high pressure turbine 24'. The reheated air is expanded, while the turbine 24' also recovers some of the heat of sensible cooling in the reheated air. And since the turbine 24' is engaged to the compressor 16' through a high pressure shaft 37', the recovered heat can be converted to useful energy.

From the turbine 24', an intermediate pressure expanded air is produced which flows through a duct 25' and back to the condenser 26'. The expanded air is warmed and absorbs a heat of condensation and heat of sensible cooling that is rejected by the water vapor bearing air. Again, the amount of absorption is similar in amount to the first embodiment. A warmed, intermediate pressure expanded air exits the condenser 26' via a duct 27' where it can then optionally flow through a temperature control valve 30', a duct 50', or through a check valve 47', the latter two of which allow entrance into the low pressure spool subsystem 40'. Through the valve 30', the supply air 31 can be warmed. Through the check valve 47', the flow can be further conditioned by the low pressure spool subsystem 40', if there is no flow entering the turbine 28' via the duct 46'. If there is such a flow from the duct 46', the flow from the condenser 26' can flow into the low pressure spool subsystem 40 (i.e., the turbine 28') through the duct 50'.

If the flow from the condenser 26' is directed into the low pressure turbine 28', through a check valve 47', the heat of condensation and sensible cooling rejected in the condenser 26' can be recovered to an extent similar to that in the first embodiment. That recovered heat can then be turned into useful energy by either or both of the turbine 28' and a fan 32' which is engaged to the turbine 28' via a low pressure shaft 38'. As in the first embodiment, a check valve 35' allows the RAM air 14' to bypass the fan 32'. A shut-off valve 43' is useful following the landing of an aircraft from a flight during which the low pressure spool 40' became inoperable. In that instance, the RAM air 14' pressure pushing the cooling air flow across the heat exchangers 12', 13' would normally be lost. To maintain useful cooling, the valve 43' opens to direct additional engine bleed air 11' into a cooling air exit duct. The momentum of this air stream draws cooling air through the heat exchangers 12', 13', replacing RAM air 14' pressure. The flow rate of the cooling air stream is about 3 times the flow rate of the bleed air 11' through the valve 43'.

For those skilled in the art, it can be appreciated that the present invention provides efficiency by enabling the two spools of the system to operate independently of one another. By so doing, one spool can operate at its optimal parameters while the other spool can do so likewise. Additionally, because the present invention enables the spools to operate in series, the flow rate through the low pressure spool (40, 40') is essentially 100% of the bleed air (11, 11') that enters the ECS (10,10'). Thus, fan (32, 32') power can increase over prior designs by about 300%. That increase translates into about 60% more flow through the heat exchangers (12, 12', 13,13'). Therefore, the heat exchangers can be sized smaller (about 22% by volume and weight). Furthermore, the present invention allows the two spools to operate in parallel when, for example, there are failure conditions or when the bleed pressure is low, such as during the flight of an aircraft.

It should be understood, of course, that the foregoing relates to preferred embodiments of the invention and that modifications may be made without departing from the spirit and scope of the invention as set forth in the following claims.

We claim:

1. A method for conditioning water vapor bearing compressed air for supply as conditioned air, comprising the steps of:

using a high pressure spool subsystem including a high pressure turbine and a compressor;

using a low pressure spool subsystem downstream of and in air flow communication with said high pressure spool subsystem, said air flow communication being in the absence of rotating engagement between said subsystems, and said low pressure subsystem including a low pressure turbine; and flowing substantially all of said compressed air first through said high pressure spool subsystem and second through said low pressure spool subsystem during normal operation.

2. The method of claim 1, wherein said high pressure spool subsystem is in a serial air flow arrangement with said low pressure spool subsystem.

3. The method of claim 1, wherein said high pressure spool subsystem can be optionally placed in a parallel air flow arrangement with said low pressure spool subsystem.

4. The method of claim 1, wherein said high pressure turbine is mechanically operable independent of said low pressure turbine and said fan and wherein said compressor is mechanically operable independently of said low pressure turbine and said fan.

5. The method of claim 1, wherein said high pressure turbine is mechanically engaged to said compressor and wherein said low pressure turbine is mechanically engaged to said fan.

6. The method of claim 1, further comprising the step of cooling said compressed air in a reheater.

7. The method of claim 1, further comprising the steps of extracting water from said compressed air and reheating said water-extracted air.

8. The method of claim 1, further comprising the step of condensing a water vapor from said compressed air.

9. The method of claim 1, further comprising the step of expanding in said high pressure turbine a reheated air.

10. The method of claim 1, further comprising the step of expanding in said low pressure turbine a heated, expanded, condensed air.

11. The method of claim 1, further comprising the step of recovering rejected heat, said step of recovering occurring in said low pressure turbine.

12. A two spool air cycle system for conditioning water vapor bearing compressed air, comprising:

a low pressure spool subsystem comprising a low pressure turbine;

a high pressure spool subsystem in air flow communication with said low pressure spool subsystem, such that said high pressure spool subsystem being capable of conditioning said compressed air prior to said low pressure spool subsystem conditioning said compressed air, said high pressure spool subsystem comprising a high pressure turbine which is mechanically operable independently of said low pressure turbine; and means for allowing substantially all of said compressed air to flow first through said high pressure spool subsystem and second through said low pressure spool subsystem during normal operation.

13. The system of claim 7, wherein said low pressure spool subsystem further comprises a fan mechanically engaged to said low pressure turbine.

14. The system of claim 13, wherein said high pressure spool subsystem further comprises a reheater, a condenser, a water extractor, and a compressor, with said high pressure turbine being mechanically engaged to said compressor.

15. The system of claim 14, wherein said low pressure turbine is in direct air flow communication with said condenser.

16. The system of claim 14, wherein said condenser is disposed intermediate said high pressure turbine and said low pressure turbine.

17. A two spool air cycle system for conditioning water vapor bearing compressed air, comprising:

a compressor;

a reheater downstream of said compressor;

a condenser downstream of said reheater;

a water extractor downstream of said condenser;

a high pressure turbine downstream of said water extractor; and a low pressure turbine downstream of said high pressure turbine and said condenser such that said low pressure turbine is mechanically operable independently of said high pressure turbine and said compressor.

18. The system of claim 16, wherein said water extractor is intermediate said reheater and said condenser.

19. The system of claim 18, wherein said reheater is intermediate said water extractor and said high pressure turbine.

20. The system of claim 19, wherein said high pressure turbine is intermediate said reheater and said condenser.

21. The system of claim 19, wherein said condenser is intermediate said high pressure turbine and said low pressure turbine.

22. The system of claim 19, further comprising means for selectively bypassing each of the subsystems, whereby one of the subsystems can condition the water vapor bearing compressed air after the other of the subsystems has failed.

23. The system of claim 19, further comprising means for selectively bypassing each of the subsystems, whereby one of the subsystems can condition the water vapor bearing compressed air after the other of the subsystems has failed.

* * * * *